April 29, 1941.  C. E. FREDERICKSON  2,239,674
DUAL WHEEL
Filed March 14, 1939  2 Sheets-Sheet 1
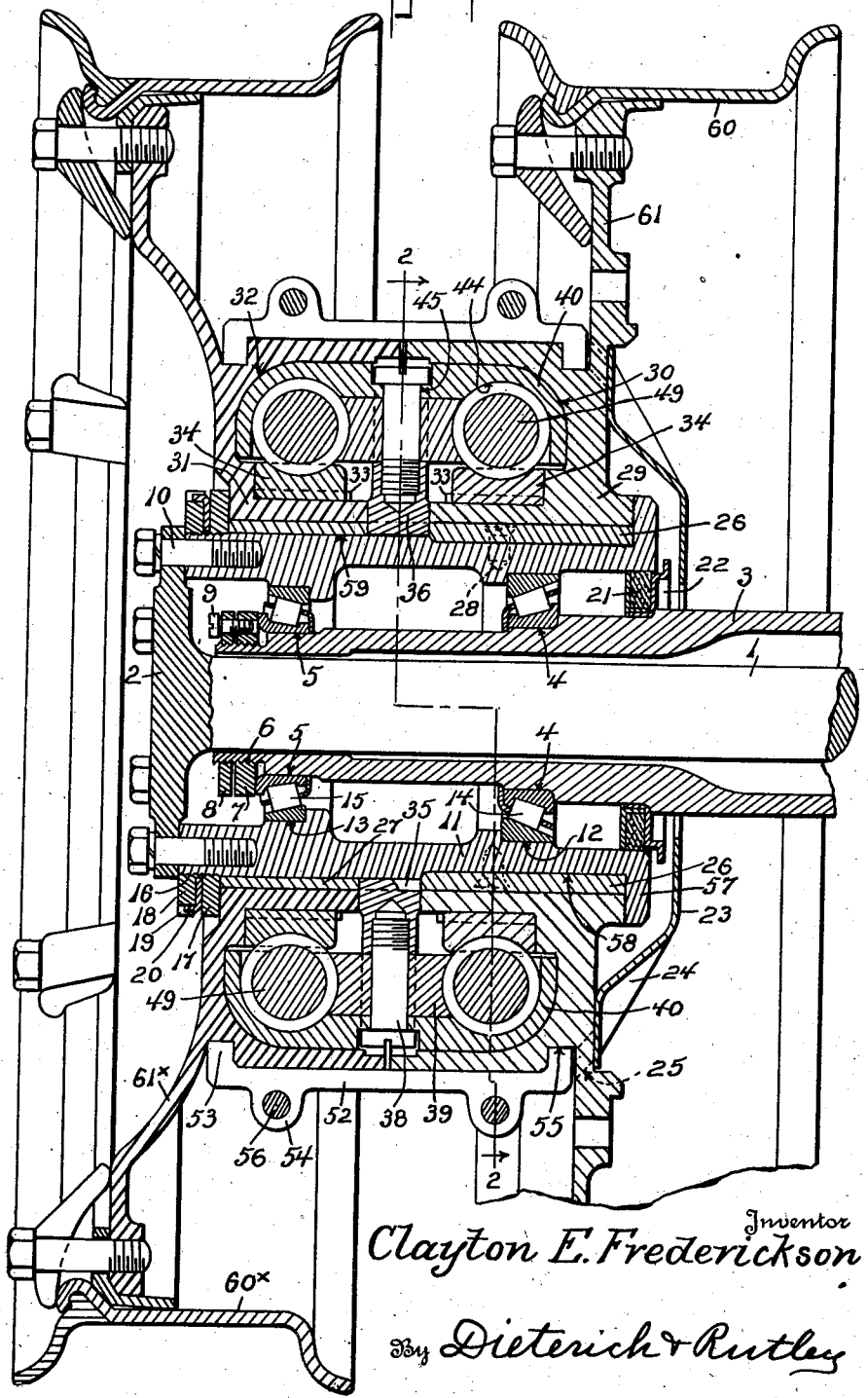
Inventor
Clayton E. Frederickson
By Dieterich & Rutley
Attorneys.

April 29, 1941.  C. E. FREDERICKSON  2,239,674
DUAL WHEEL
Filed March 14, 1939  2 Sheets-Sheet 2
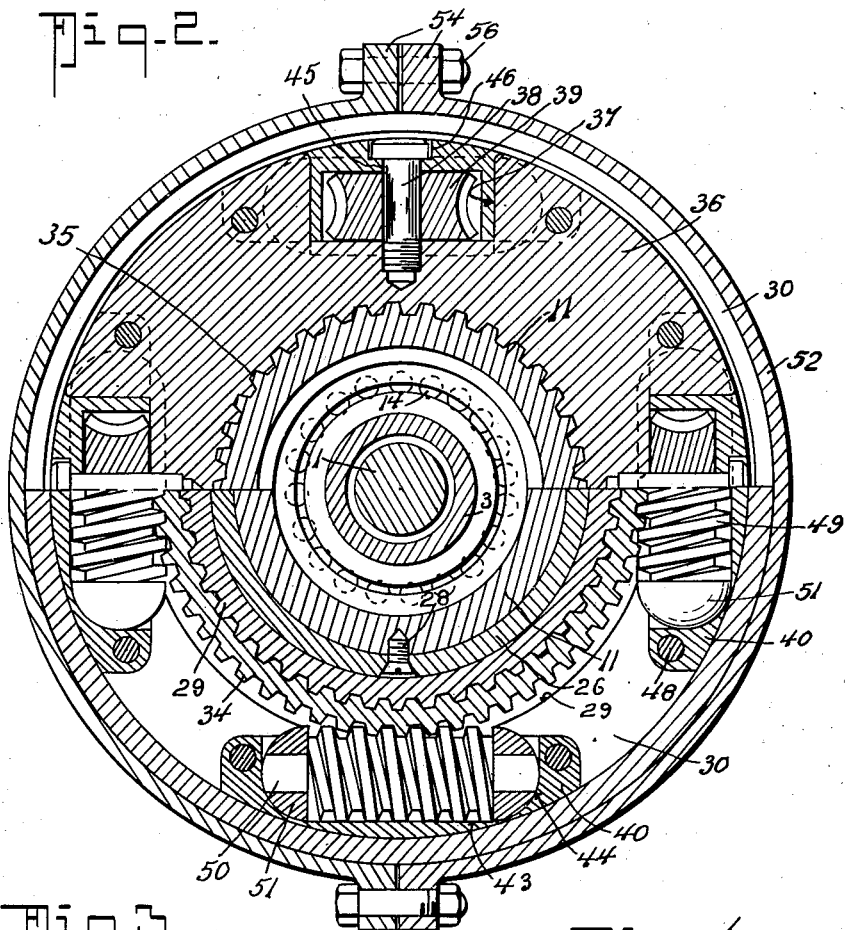
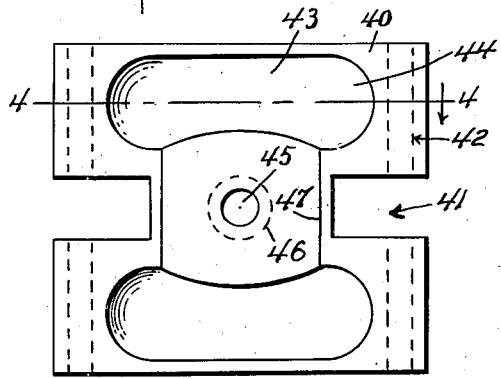
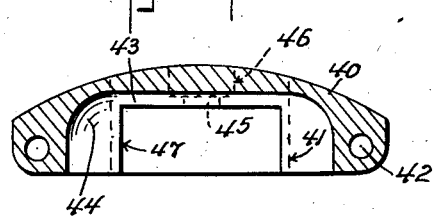
Clayton E. Frederickson, Inventor
By Dieterich & Rutley
Attorneys Patented Apr. 29, 1941

2,239,674

UNITED STATES PATENT OFFICE 2,239,674

DUAL WHEEL

Clayton Erasmus Frederickson, Chicago, Ill.

Application March 14, 1939, Serial No. 261,817

8 Claims. (Cl. 180—22)

My invention relates to certain new and useful improvements in dual wheels, such as are frequently used on trucks, busses, and other forms of motor vehicles.

Such wheels comprise a single hub structure with a disc carrying two separate rims, one for each tire, or two complete wheels are bolted together to turn as one. With the dual wheels of the constructions aforesaid the tires wear comparatively faster than when only one wheel and tire is used; this is due to the fact that, in turning, both tires rotating together, the outer one of the two on the turn must be dragged along a distance proportional to the difference in the radii of turn.

My invention seeks to avoid this by providing the wheel with a differential connection between a common hub and the individual hubs of the two wheels.

Further, the invention has for its object to provide a dual wheel the two members of which have a common hub for mounting on the axle housing or spindle, and to provide a driving connection from the hub to the two tire-carrying members whereby each is positively driven, and yet each is free to turn with respect to the other when one tire encounters more resistance than the other.

Again, it is an object to provide a dual wheel that is especially adapted to trucks and heavy busses, is rugged in construction and is capable of standing up under hard usage.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a central vertical cross section of a dual wheel embodying the invention, tires being omitted and parts being broken away.

Fig. 2 is a section on the line 2—2 of Fig. 1.

Fig. 3 is an inverted plan view of one of the key-worm carriers.

Fig. 4 is a section on the line 4—4 of Fig. 3.

In the drawings, in which like numbers of reference indicate like parts in all figures, 1 is the driving shaft which has the usual end disc 2, which is bolted to the hub 11 to turn the same. The shaft 1 turns in the axle housing 3, which is stationary and which is provided with bearing seats 4 and 5 for the anti-friction bearings 14 and 15, which also rest in seats 12 and 13 in the central passageway of the hub 11. The housing 3 has its ends threaded as at 6 to receive the bearing adjusting and holding nuts 7 and 8. The nuts 7 and 8, when screwed together tightly, may be locked by a screw 9.

Bolts 10 secure the axle disc 2 to the hub 11 so these parts will turn as one.

One end of the hub 11 is flanged as at 57, while the other end is threaded, as at 16, to receive the nuts 17 and 18 and the lock washer 20 whose radial tangs may be bent over into the recesses or peripheral notches 19, as shown clearly in Fig. 1.

A suitable grease hold back felt 21 and a grease throw off ring 22 are provided as shown.

The hub 11 has two bearing bush seats 58 and 59 respectively, separated by a key and groove or toothed portion 35. Since the seat 58 is deeper than seat 59 the bushing 26 that fits thereon is made in two parts and secured to the hub 11 by countersunk screws 28, while bushing 27 is of one piece and is held in place by the nuts 17 and 18.

The respective wheel elements 61, 61x have hubs 29, 31, respectively. The hubs 29, 31 have annular pockets 30, 32 respectively to receive the key-worm carriers 40 and the internally keygrooved worm gears 34 which fit on external key-grooves 33 of the respective hubs 29, 31.

The carriers 40 (one for each pair of keyworms 49) have slots 41 in the mid-plane to receive the driving plate 36 which is internally key-grooved to fit on the key-grooved center portion 35 of the hub 11.

The carriers 40 also have pin holes 42 for the connecting pins 48 which connect the carriers to the driving plate. Pockets 43 having semispherical ends 44 are provided in the carriers to receive the key-worms 49 and their semispherical bearings 51 that are provided on the stub shaft ends 50. The central portions of the carriers are recessed at 47 and provided with holes 45, countersunk at 46, to receive the studs 38 which carry the worm pinions 39 that lie in the recesses 47 and mesh with the key-worms 49 at either side.

A plate 23 is fastened to the side of the inner wheel and is provided with grease guides or channels 25 which direct grease thrown off by the member 22 to passages 25 and deliver the grease to the grooves 55 to lubricate the same.

The driving disc 36 has cut-out portions 37 to receive the central portion of the carriers, while the side portions of the carriers straddle the driving plate.

The sub-hubs 29 and 31 are provided with peripheral grooves 55 at the sides in which the flanges 53 of a transversely divided coupling band 52 ride.

The band 52 has ears 54 through which pass bolts 56 with nuts for securing the band segments together. The band 52 has a turning fit on the sub-hubs, or rather the sub-hubs have a turning fit in the band.

*Operation*

As will be seen, the two wheel elements 61 which carry the rims 60 are positively driven by the shaft 1 acting through hub 11, driving plate 36, key-worm carriers 40, key-worms 49, worm gears 34, and hubs 29 and 31. When, however, one wheel element 61 must turn at a different rate than the other, worm gears 39 will allow differentiation.

From the foregoing it will be seen that should one wheel have less traction than the other, still power enough will be applied to the other wheel to alone propel the vehicle until the wheel having the lesser traction takes hold again with equal traction to that of the other wheel, whereupon equal driving force will be applied to both wheels of the dual unit. This is due to the fact that the action of the spiral-key pinion connections between the two hubs 29, 31 and driving hub 11 is somewhat more sluggish than would be the case were a bevel pinion type differential used.

The present drawings illustrate and the foregoing description describes the preferred embodiment of the invention. I wish it understood, however, that changes in the details of construction, combination and arrangement of parts may be made without departing from the spirit of the invention and within the scope of the appended claims.

From the foregoing construction, taken in connection with the accompanying drawings, it is thought that the construction, operation and advantages of the invention will be clear to those skilled in the art.

What I claim is:

1. A dual wheel comprising two wheels, a common hub on which the wheels are rotatably mounted, a differential driving connection between said hub and said wheels, said driving connection including individual hubs as parts of the respective wheels, said individual hubs being rotatably mounted on said common hub, a driving element carried by said common hub and rotatable therewith, worm pinions rotatably mounted on said driving hub, worm gears mounted on and turning with said individual hubs, key-worm carriers connected to and turning with said driving element, key-worms rotatably mounted in said carriers and meshing respectively with said worm pinions and with said worm gears.

2. In a dual wheel, a driving hub, two individual wheels each having an individual hub rotatably mounted on said driving hub, a driving element disposed on and turning with said driving hub between said individual hubs, said individual hubs each having an annular pocket open at the side adjacent said driving element, a worm gear in each pocket secured to turn with its respective hub, key-worm carriers secured to said driving element, and extending laterally into the annular pockets of both individual hubs, a key-worm in each pocket and carried by each of said carriers to mesh with the respective worm gears, and worm pinions rotatably mounted on said driving element for connecting the key-worm at one side of a carrier to that at the other side of the same.

3. In a dual wheel, two wheel units each including an individual hub, a driving hub common to both wheels and on which said individual hubs are rotatably mounted, a driving disc keyed to said driving hub and located between said individual hubs, said individual hubs having annular pockets facing said driving disc, a worm gear in each pocket keyed to the respective wheel hub, at least one key-worm carrier secured to said driving disc and projected into said pockets, key-worms rotatably mounted on said carrier, there being at least one key-worm for each worm gear, and a worm pinion rotatably mounted on said driving disc between the oppositely disposed key-worms and connecting the same.

4. In a dual wheel, two wheel units each including an individual hub, a driving hub common to both wheels and on which said individual hubs are rotatably mounted, a driving disc keyed to said driving hub and located between said individual hubs, said individual hubs having annular pockets facing said driving disc, a worm gear in each pocket keyed to the respective wheel hub, at least one key-worm carrier secured to said driving disc and projected into said pockets, key-worms rotatably mounted on said carrier, there being at least one key-worm for each worm gear, a worm pinion rotatably mounted on said driving disc between the oppositely disposed key-worms and connecting the same, said individual hubs having annular recesses, and an annular connecting body surrounding said individual hubs and having flanges to engage in said annular recesses.

5. In a dual wheel, two wheel units each including an individual hub, a driving hub common to both wheels and on which said individual hubs are rotatably mounted, a driving disc keyed to said driving hub and located between said individual hubs, said individual hubs having annular pockets facing said driving disc, a worm gear in each pocket keyed to the respective wheel hub, at least one key-worm carrier secured to said driving disc and projected into said pockets, key-worms rotatably mounted on said carrier, there being at least one key-worm for each worm gear, a worm pinion rotatably mounted on said driving disc between the oppositely disposed key-worms and connecting the same, means to hold said individual hubs on said driving hub against movement along its axis, said last named means comprising a flange on one end of said driving hub and locked nuts on the other end thereof, between which said individual hubs are located.

6. In a dual wheel, two wheel units each including an individual hub, a driving hub common to both wheels and on which said individual hubs are rotatably mounted, a driving disc keyed to said driving hub and located between said individual hubs, said individual hubs having annular pockets facing said driving disc, a worm gear in each pocket keyed to the respective wheel hub, at least one key-worm carrier secured to said driving disc and projected into said pockets, key-worms rotatably mounted on said carrier, there being at least one key-worm for each worm gear, a worm pinion rotatably mounted on said driving disc between the oppositely disposed key-worms and connecting the same, said key-worm carrier comprising a body having centrally disposed slots in its ends, a central recessed portion and two side pockets in which said keyworms are respectively disposed, said driving disc having an opening to receive said central recessed portion with the disc lying in said slots, means passing through said disc and the side portions of said carrier body for securing the body to the disc, said worm pinion lying in said central recessed portion, and a stud carried by said driving disc and on which stud said worm pinion is mounted.

7. As a new article for use as a replacement in a dual wheel of the character described, a keyworm carrier comprising a body having a centrally disposed recessed portion and end slots, and having two side wings in each of which is a pocket having spherical-segment ends and each of which communicates with said recessed portion, said body also having a central hole to permit passage of a stud and having pin holes near the ends of said wings, those of one wing aligning with those of the other wing and communicating with said end slots respectively.

8. As a new article for use as a replacement in a dual wheel of the character described, a keyworm carrier comprising a body having a centrally disposed recessed portion and end slots, and having two side wings in each of which is a pocket having spherical-segment ends and each of which communicates with said recessed portion, said body also having a central hole to permit passage of a stud and having pin holes near the ends of said wings, those of one wing aligning with those of the other wing and communicating with said end slots respectively, and keyworms having stub shafts at their ends journalled in semi-spherical bearings located in said pockets.

CLAYTON ERASMUS FREDERICKSON.